US008742608B2

(12) United States Patent
Micu

(10) Patent No.: US 8,742,608 B2
(45) Date of Patent: Jun. 3, 2014

(54) DRIVE SYSTEM FOR USE WITH FLOWING FLUIDS

(76) Inventor: Tarfin Micu, New Braunfels, TX (US)

( * ) Notice: Subject to any disclaimer, the term of this patent is extended or adjusted under 35 U.S.C. 154(b) by 1009 days.

(21) Appl. No.: 12/464,808

(22) Filed: May 12, 2009

(65) Prior Publication Data

US 2010/0225119 A1 Sep. 9, 2010

Related U.S. Application Data

(63) Continuation-in-part of application No. 12/398,410, filed on Mar. 5, 2009, now Pat. No. 8,264,096.

(51) Int. Cl.
*F03B 13/00* (2006.01)
*F03B 13/10* (2006.01)
*F03B 13/12* (2006.01)

(52) U.S. Cl.
USPC ............... 290/44; 290/43; 290/53; 290/54; 290/55

(58) Field of Classification Search
CPC ...... Y02E 10/723; Y02E 10/28; Y02E 10/725
USPC .................. 290/44, 43, 53, 54, 55; 310/83
IPC .............. F03B 13/00, 13/10, 13/12; H02P 9/04
See application file for complete search history.

(56) References Cited

U.S. PATENT DOCUMENTS

| 2,153,523 | A | * | 4/1939 | Edmonds et al. | 290/55 |
|---|---|---|---|---|---|
| 2,563,279 | A | | 8/1951 | Rushing | |
| 3,637,995 | A | | 1/1972 | Segawa | |
| 4,039,848 | A | * | 8/1977 | Winderl | 290/55 |
| 4,717,831 | A | | 1/1988 | Kikuchi | |
| 6,943,472 | B2 | | 9/2005 | Buss et al. | |
| 7,384,239 | B2 | * | 6/2008 | Wacinski | 416/128 |
| 7,777,360 | B2 | * | 8/2010 | Hong | 290/55 |
| 2004/0012282 | A1 | | 1/2004 | Haga et al. | |
| 2006/0093482 | A1 | | 5/2006 | Wacinski | |
| 2007/0116563 | A1 | | 5/2007 | Ahmad | |
| 2008/0070739 | A1 | * | 3/2008 | Nakamura et al. | 475/269 |
| 2008/0265585 | A1 | * | 10/2008 | Torres Martinez | 290/55 |
| 2010/0066095 | A1 | * | 3/2010 | Meller | 290/55 |
| 2010/0090468 | A1 | * | 4/2010 | Hong | 290/55 |
| 2010/0259050 | A1 | * | 10/2010 | Meller | 290/55 |

FOREIGN PATENT DOCUMENTS

KR WO2006101323 * 9/2006 ............ F03D 1/02

* cited by examiner

*Primary Examiner* — Terrance Kenerly
(74) *Attorney, Agent, or Firm* — Bryan L. White

(57) ABSTRACT

The present invention includes a drive system for use in a flowing fluid, the drive system preferably having a first turbine connected to a shaft, a first gear connected to the shaft, a second turbine rotatably mounted on a pipe, a second gear rotatably mounted on the pipe and connected to the second turbine, and two or more satellite gears in fixed locations relative to the pipe and rotatably engaged, directly or indirectly, with the first gear and the second gear. The drive system may be used, for example, in a wind generator to generate electrical energy.

20 Claims, 7 Drawing Sheets

DRIVE SYSTEM FOR USE WITH FLOWING FLUIDS

CROSS-REFERENCE TO OTHER APPLICATIONS

This application is a continuation-in-part of U.S. patent application Ser. No. 12/398,410, filed on Mar. 5, 2009, now U.S. Pat. No. 8,264,096 and claims priority to and the benefit of that application.

BACKGROUND OF INVENTION

1. Field of the Invention

The present invention relates generally to extracting energy from a flowing fluid, and particularly to transferring the kinetic energy of a flowing fluid to a rotatable shaft.

2. Background Art

Devices such as windmills and wind generators have been used for many years to extract energy from the wind and use it to do work. For example, windmills have traditionally been used to pump water or turn a millstone. Wind generators are used to convert the mechanical (i.e., kinetic) energy of the wind to electrical energy. Both windmills and wind generators get their energy from wind blowing onto rotating blades that cause a shaft to rotate. In the applications described above, the rotating shaft is coupled to a mechanical device or an electrical generator.

The efficiency of prior art devices that use the wind's kinetic energy to do work is not very high. For example, in many configurations much of the wind flows past the blades without hitting them. Thus, a great deal of energy remains in the wind. In other configurations, the air flow is effectively blocked and the wind energy goes into the support structure instead of the drive mechanism. While many drive systems have been tried, each of the prior art systems has a low efficiency when it comes to extracting the wind's energy.

SUMMARY

The present invention preferably includes a drive system having a first turbine connected to a shaft, a first gear connected to the shaft, a second turbine rotatably mounted on a pipe, a second gear rotatably mounted on the pipe and connected to the second turbine, and two or more satellite gears in fixed locations relative to the pipe and rotatably engaged, directly or indirectly, with the first gear and the second gear. The drive system may be used, for example, in a wind generator.

Other aspects and advantages of the invention will become apparent from the following description and the attached claims.

It is to be understood that the drawings are to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency.

Figure 1:
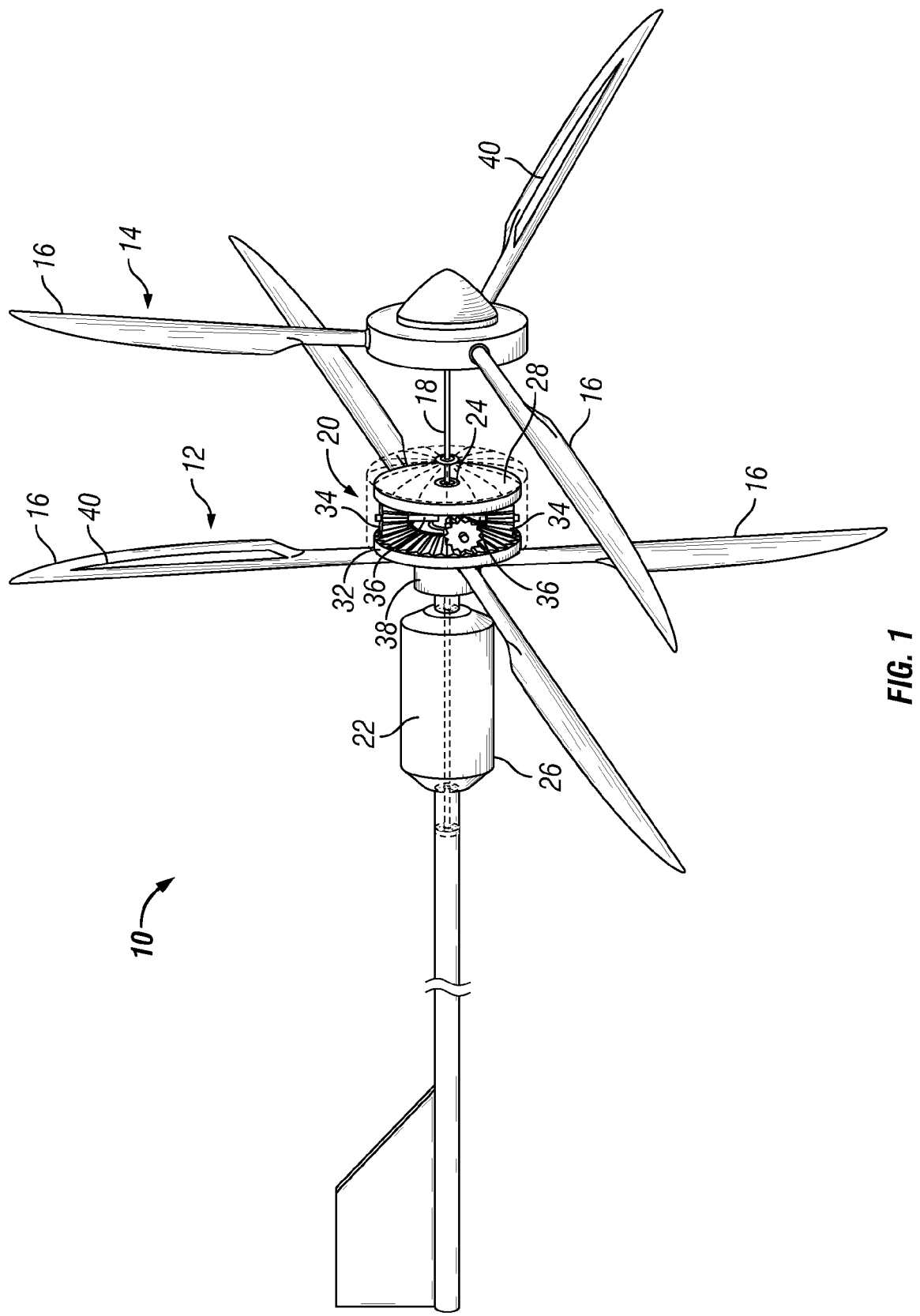
FIG. 1 is a schematic drawing of a wind generator that includes one embodiment of a drive system constructed in accordance with the present invention.

FIG. 1 shows a wind generator 10 with a first turbine 12 and a second turbine 14. First turbine 12 has four blades 16 in the embodiment shown, though more or fewer blades could be used. Similarly, second turbine 14 has three blades 16 in the embodiment shown, though more or fewer blades could be used. Second turbine 14 is connected to a shaft 18 that extends through a gearbox 20 and into an electrical generator 22. Shaft 18 serves to rotate the rotor of generator 22, as is well known in the art. Shaft 18 is preferably aligned with an axis of symmetry of second turbine 14 so as to be statically and dynamically balanced when rotated.

Figure 3A:
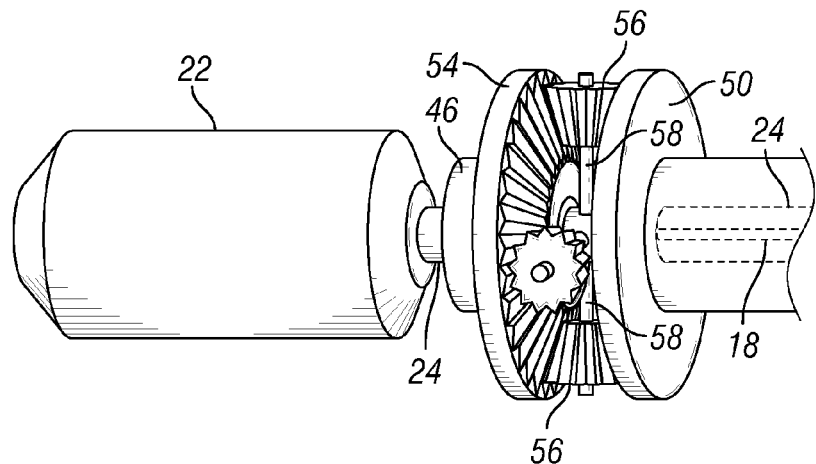
FIGS. 3A and 3B are schematic detailed views of some of the gearing used in accordance with the present invention.
Figure 3B:
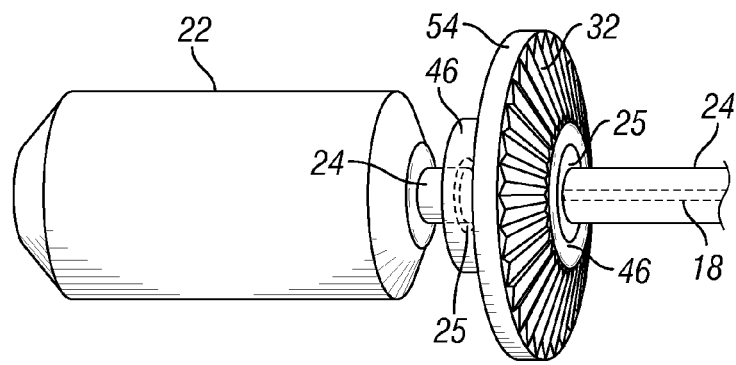
Figure 4:
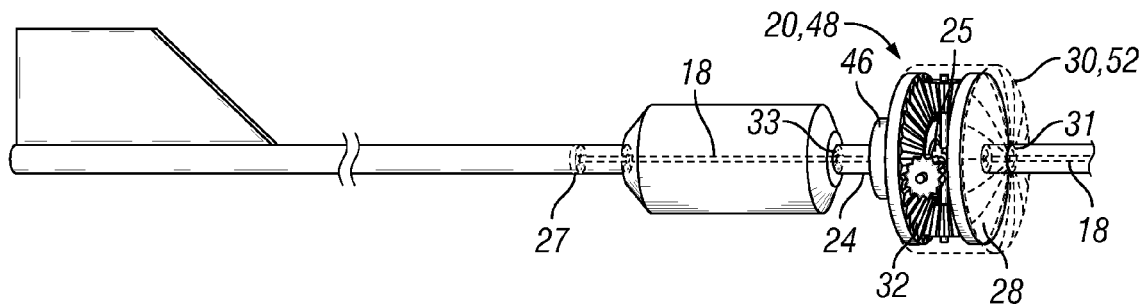
FIG. 4 is a schematic detailed view of a gearbox showing a gearbox housing and some of the gearing used in accordance with the present invention.

Wind generator 10 also has a pipe 24 disposed between first turbine 12 and electrical generator 22. Pipe 24 may be an integral extension of a generator housing 26 or it may be a separate component mounted to generator housing 26. Pipe 24 has a hollow interior so as to allow shaft 18 to pass through the hollow interior region. Pipe 24 is preferably coaxially aligned with shaft 18 and shaft 18 may be mounted in bearings 25 (see FIGS. 3A, 3B, and 4) disposed in the annular region between shaft 18 and pipe 24. Second turbine 14 is cantilevered from shaft 18 in the embodiment shown, though other mounting configurations could be used.

Gearbox 20 is mounted on pipe 24 between first turbine 12 and second turbine 14. A first ring gear 28 is disposed in gearbox 20 and is attached to shaft 18 adjacent to a forward end of pipe 24. FIG. 1 shows a partially exploded or exaggerated view in which second turbine 14 is translated forward of its normal operating position. That is for illustration only. In addition, gearbox 20 has a gearbox housing 30 (see FIG. 4) that is only partially shown so that the interior of gearbox 20 can be seen. First ring gear 28 is proximate to and engages other gears within gearbox 20, as described below. Thus, shaft 18, first ring gear 28, and second turbine 14 all rotate together. A front seal 31 may be used to seal the annular opening between shaft 18 and gearbox housing 30. Similarly, a rear seal 33 can be used to seal the annular space between shaft 18 and a rearward end of pipe 24, near where shaft 18 enters the main portion of generator housing 26. A second ring gear 32 is disposed in gearbox 20 and is rotatably mounted on pipe 24 using, for example, bearings 25. Second ring gear 32 is attached on its rearward side to first turbine 12, as described in more detail below.

Two or more satellite gears 34 are disposed between and rotatably engage first ring gear 28 and second ring gear 32.

Preferably two pairs of diametrically opposed satellite gears 34 are used (i.e., four gears spaced ninety degrees apart), but more or fewer satellite gears 34 may be used. First ring gear 28, second ring gear 32, and satellite gears 34 are all preferably beveled in a complementary fashion, as is known in the art, so as to allow satellite gears 34 to simultaneously engage and rotate relative to first ring gear 28 and second ring gear 32. Each satellite gear 34 is rotatably mounted on one end of an associated rod 36. The other end of that associated rod 36 is attached to pipe 24. Thus, while each satellite gear 34 is free to rotate about its associated rod 36, each satellite gear 34 remains in a fixed location relative to pipe 24. It is worth noting here that, in the configuration described, first ring gear 28 and second ring gear 32 rotate in opposite directions.

Alternatively, ring gears 28, 32 and satellite gears 34 could be replaced with disks and rollers, or a combination of ring gears, satellite gears, disks, and rollers could be used. For example, one satellite gear could be used in conjunction with two ring gears, wherein the ring gears have circular bearing surfaces on which a roller, positioned diametrically opposite the satellite gear, could roll. Many such combinations could be used (e.g., two satellite gears along with two rollers, all spaced ninety degrees apart).

As shown and as alluded to above, first turbine 12 is rotatably mounted on pipe 24, rearward of gearbox 20. First turbine 12 may be mounted using, for example, bearings 25. A first sleeve 38 of slightly larger diameter than pipe 24 extends from first turbine 12 into gearbox 20. As stated above, first sleeve 38 is attached to the rearward side of second ring gear 32. First sleeve 38 may have, for example, a flange (not shown) on one or both ends by which it is attached to the described adjoining structure (e.g., second ring gear 32 or first turbine 12). Alternatively, first sleeve 38 may be an integral part of one of the adjoining structures. For example, first sleeve 38 may be an integral extension of the bearing 25 on which first turbine 12 is mounted. Appropriate seals may be used to seal between pipe 24 and first sleeve 38 and between first sleeve 38 and gearbox housing 30.

Figure 2:
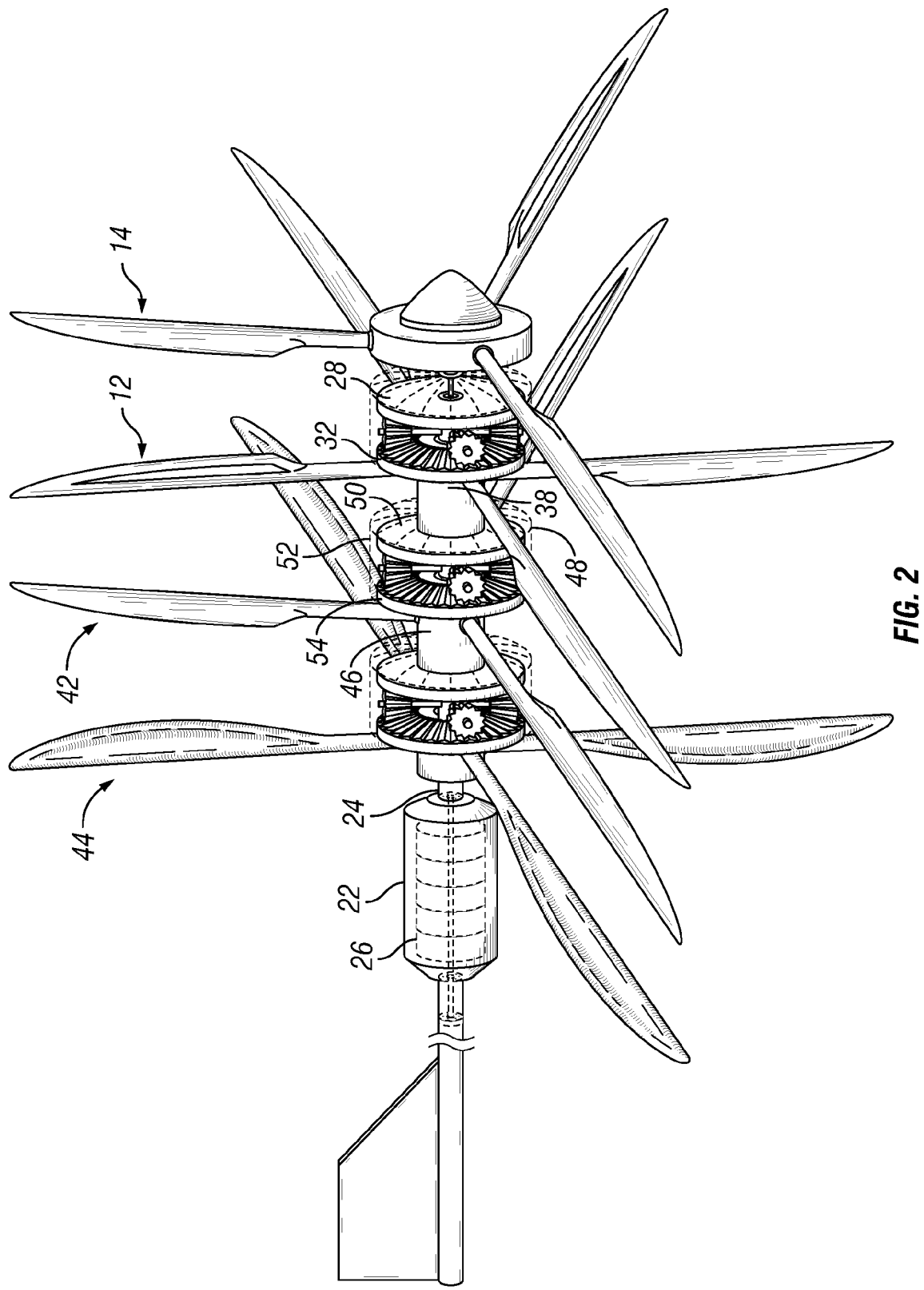
FIG. 2 is a schematic drawing of a wind generator that includes an alternative embodiment of a drive system constructed in accordance with the present invention.

Returning now to blades 16, either conventional blades, i.e., those known in the art, or non-conventional blades, as described herein, may be used. One example of a non-conventional blade is one having a much larger surface area than a conventional blade. It may also have a concave profile rather than a conventional "propeller-type" contour. (See blades 16 on turbine 44 in FIG. 2.) The non-conventional blade may be tapered to have variable width along its length. The primary design criteria for the non-conventional blade, as contemplated here, is to catch as much wind as is practicable, and to also influence the direction of the wind exiting the blade surface. The contour and widths of blades 16 may be optimized for torque power, rotational speed, or a combination of torque and speed. Blades 16 may also have heating elements 40, such as resistive wires, embedded in or otherwise mounted onto blades 16. Blades 16 of second turbine 14 are designed to catch wind and cause second turbine 14 to rotate in a particular direction. Blades 16 of first turbine 12 are designed to catch wind and cause first turbine 12 to rotate in the direction opposite to that of second turbine 14

In operation, wind generator 10 takes energy from the wind and converts it to electrical energy. As wind blows past blades 16 of second turbine 14, it causes second turbine 14 and shaft 18 to spin. When shaft 18 spins, it causes electricity to be generated by electrical generator 22, as is known in the art. The vast majority of the wind that blows past second turbine 14 does so without impinging on blades 16 of second turbine 14. Thus, a great deal of wind energy goes untapped, as is the case for prior art wind generators. However, using the present invention, the wind that either passes freely through second turbine 14 or is deflected rearward by blades 16 of second turbine 14 may be caught by blades 16 of first turbine 12. As stated above, the wind impinging on blades 16 of first turbine 12 causes first turbine 12, and thereby second ring gear 32, to rotate in the direction opposite to the rotation of second turbine 14. The oppositely directed rotation of first turbine 12 and second ring gear 32 cause satellite gears 34 to rotate in place, transferring the torque of second ring gear 32 to first ring gear 28. The rotation of satellite gears 34 cause first ring gear 28 to rotate in a direction opposite that of second ring gear 32. That is, first ring gear 28 is driven by first turbine 12 such that first ring gear 28 applies a cooperative torque (i.e., in the same direction as that applied by second turbine 14) on shaft 18, thereby increasing the net torque on shaft 18.

The use of multiple turbines to drive a common shaft can be extended to any number of turbines, though constraints may impose practical limits. For example, in the embodiment shown in FIG. 2, four turbines are shown: first turbine 12, second turbine 14, third turbine 42, and fourth turbine 44. First and second turbines 12, 14 are essentially as described above, along with the described gearing mechanism. However, first turbine 12 now has a second sleeve 46, disposed coaxially about pipe 24, that extends rearward toward third turbine 42. Similar to first sleeve 38, second sleeve 46 is of slightly larger diameter than pipe 24 and extends from first turbine 12 into a second gearbox 48. Second sleeve 46 is attached to the forward side of a third ring gear 50, which is disposed in second gearbox 48 and rotatably mounted to pipe 24. Second sleeve 46 may have, for example, a flange (not shown) on one or both ends by which it is attached to the described adjoining structure (e.g., third ring gear 50 or first turbine 12). Alternatively, second sleeve 46 may be an integral part of one of the adjoining structures. For example, second sleeve 46 may be an integral extension of the bearing 25 on which first turbine 12 is mounted. Appropriate seals may be used to seal between pipe 24 and second sleeve 46 and between second sleeve 46 and a second gearbox housing 52. A fourth ring gear 54 is disposed in second gearbox 48 and is rotatably mounted on pipe 24 using, for example, bearings 25. Fourth ring gear 54 is attached on its rearward side to third turbine 42, as described in more detail below.

Two or more satellite gears 56 (FIG. 3A) are disposed between and rotatably engage third ring gear 50 and fourth ring gear 54. Preferably two pairs of diametrically opposed satellite gears 56 are used (i.e., four gears spaced ninety degrees apart), but more or fewer satellite gears 56 may be used. Third ring gear 50, fourth ring gear 54, and satellite gears 56 are all preferably beveled in a complementary fashion, as is known in the art, so as to allow satellite gears 56 to simultaneously engage and rotate relative to third ring gear 50 and fourth ring gear 54. Each satellite gear 56 is rotatably mounted on one end of an associated rod 58. The other end of that associated rod 58 is attached to pipe 24. Thus, while each satellite gear 56 is free to rotate about its associated rod 58, each satellite gear 56 remains in a fixed location relative to pipe 24. In the configuration described, third ring gear 50 and fourth ring gear 54 rotate in opposite directions. Stated differently, second ring gear 32, first turbine 12, and third ring gear 50 all rotate in the same direction while fourth ring gear 54, third turbine 42, second turbine 14, and first ring gear 28 all rotate in the opposite direction. The turbines, by virtue of the gearing mechanisms, have their respective torques combined so as to drive shaft 18 in a desired direction. Blades 16 of each turbine are configured to drive their respective turbine in the appropriate direction.

One may choose to limit the number of turbines to three, and use the three-turbine embodiment described above, or one may incorporate fourth turbine 44 into the drive system. Fourth turbine 44 may be added into the drive mechanism in the same way that third turbine 42 was added. In the manner described above, a fifth ring gear would be attached to third turbine 42, and a sixth ring gear would be attached to fourth turbine 44. Satellite gears would transfer the torque from fourth turbine 44 to third turbine 42, whereby it would ultimately be transferred onto shaft 18. Any desired number of turbines could be added in this manner.

While the invention has been described in terms of generating electrical power using a wind generator, the drive system may be used in other applications. That is, multiple turbines may extract energy from a flowing fluid and work cooperatively through a gear train to rotate a shaft. The rotating shaft, or more precisely, the kinetic energy extracted from the flowing fluid, may be put to various uses beyond that of generating electrical power. For example, the drive system could power a pump to lift or move fluids. The drive system could be adapted for use in any conventional application of a windmill, though it is certainly not limited to those applications.

The drive system could also be adapted for use with flowing liquids, such as water. The blades would typically be shorter because of the difference in flow dynamics, but the fundamental idea of cooperative turbines is the same. In addition, the drive system could be used in oil and gas exploration or production. For example, the system could be used downhole to provide power (electrical or mechanical), for example, for logging tools (e.g., resistivity, nuclear, nuclear magnetic resonance, while-drilling tools, telemetry, sampling, etc.) or completion hardware (e.g., packers, safety valves, formation isolation valves, perforating guns, etc.). The above examples are illustrative only and the invention is not limited just to those. The fluid could be, for example, drilling fluid ("mud") or production/wellbore fluid.

Dimensions of the drive system may be optimized to minimize vibration of the drive shaft and to distribute external loading through the gear train. For example, the ring gear diameters could be chosen so as to distribute the dynamic pressure of the wind over a relatively large area, thereby reducing the pressure. One or more of the bearings used to secure the shaft may be a pressure bearing 27. Also, though "direct drive" systems have been described herein, the output shaft of the drive system could serve as an input to a conventional gearing system to control, for example, angular speed or torque.

Figure 5:
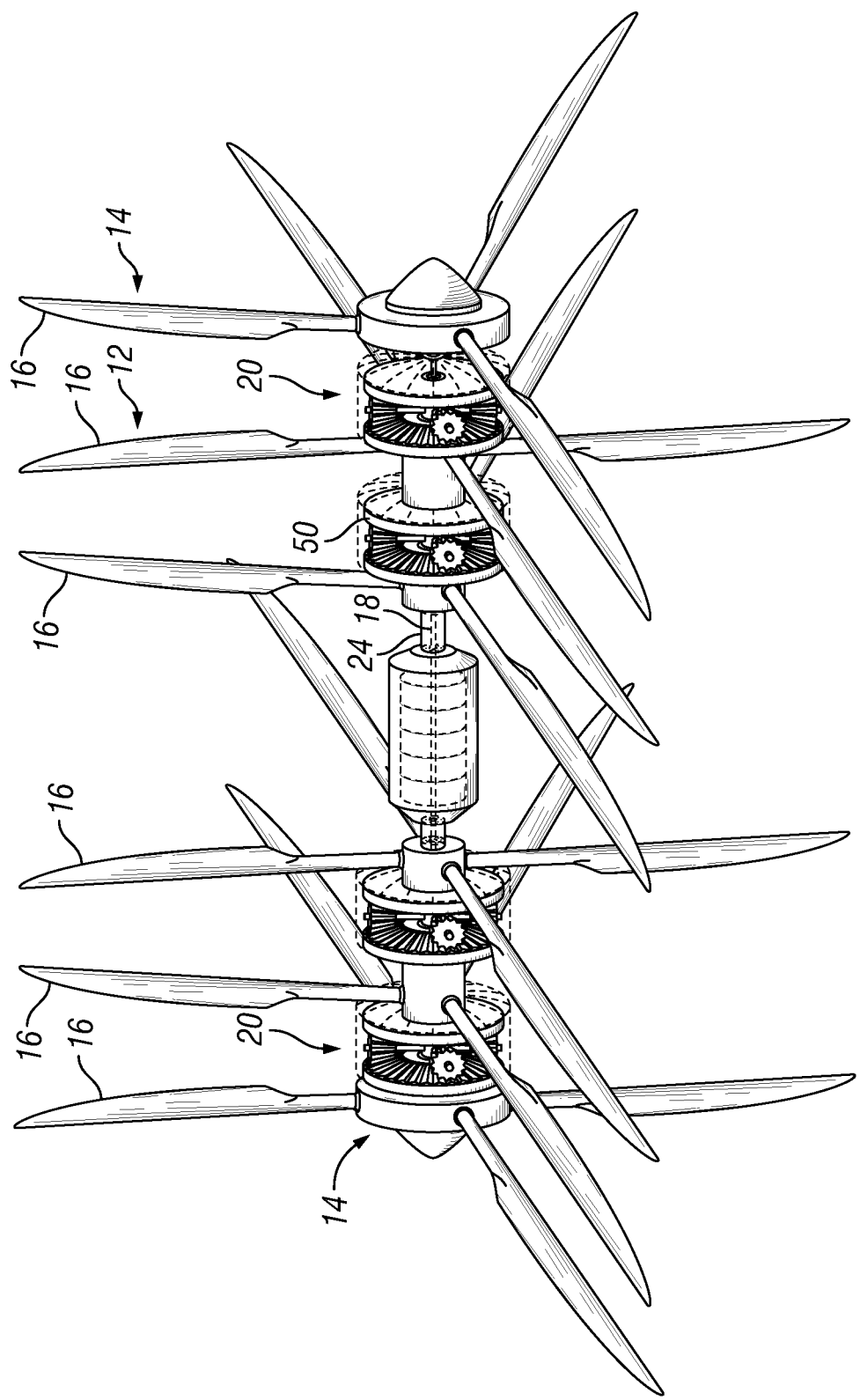
FIG. 5 is a schematic drawing of a wind generator that includes an alternative embodiment of a drive system constructed in accordance with the present invention.

Though the embodiments shown have the drive system offset to one side of a connecting apparatus (e.g., a generator), the invention is not limited to such configurations. For example, FIG. 5 shows that the rotating shaft could extend through the connecting apparatus and a drive system may be coupled to that portion (that is, the opposite end) of the shaft as well. Similarly, separate shafts and drive systems may be mounted on either side of the connecting apparatus, with each shaft coupling cooperatively to the connecting apparatus. In the case of a wind generator, such embodiments would preferably not have a tail section to control the orientation of the turbines relative to the wind direction. Instead, such orientation is preferably electronically controlled.

Figure 6:
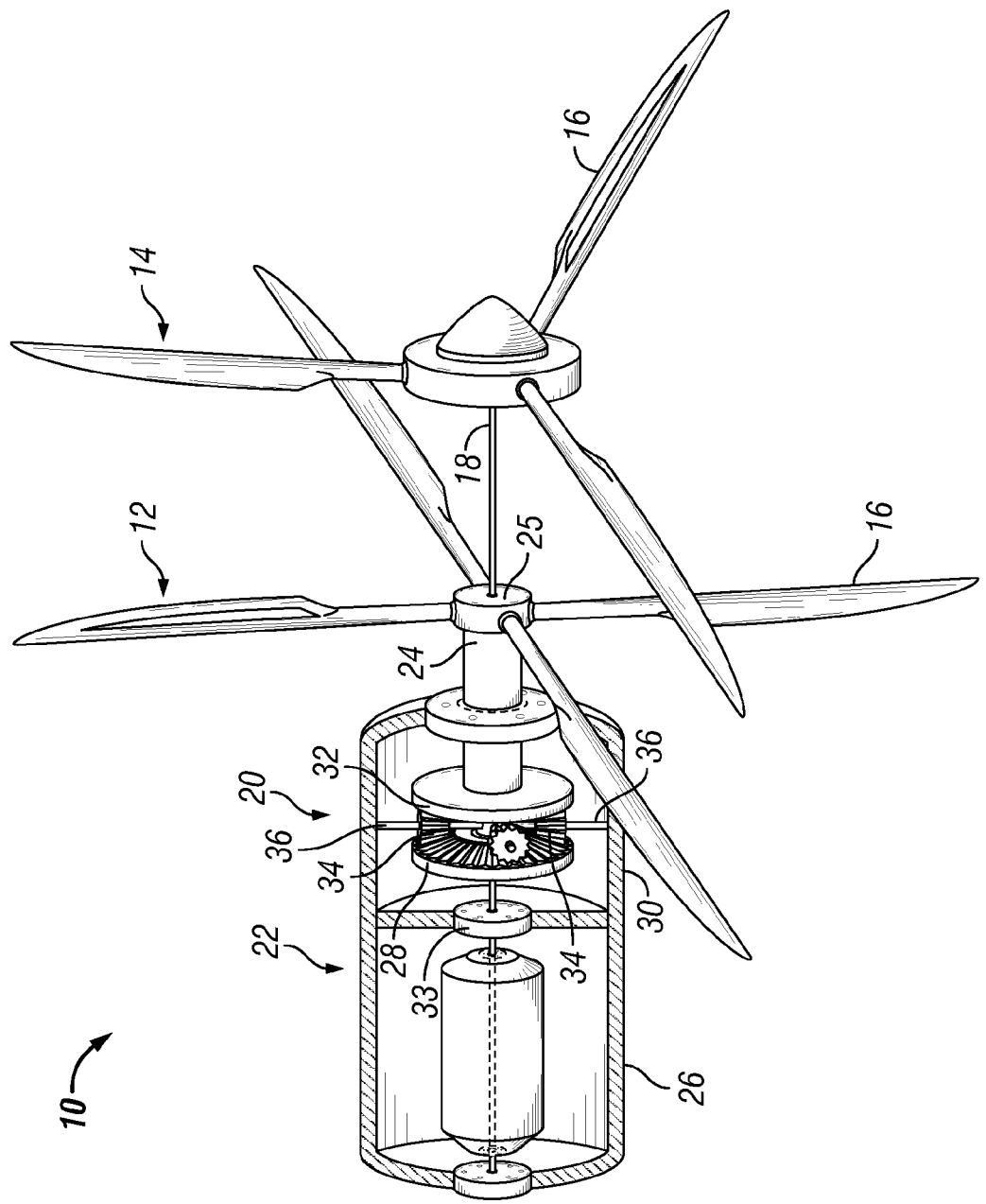
FIG. 6 is a schematic drawing of a wind generator that includes an alternative embodiment of a drive system constructed in accordance with the present invention.

FIG. 6 shows an alternative embodiment of the drive system. FIG. 6 shows a wind generator 10 with a first turbine 12 and a second turbine 14. First turbine 12 has four blades 16 in the embodiment shown, though more or fewer blades could be used. Similarly, second turbine 14 has three blades 16 in the embodiment shown, though more or fewer blades could be used. Second turbine 14 is connected to a shaft 18 that extends through a gearbox 20 and into an electrical generator 22. Gearbox 20 is shown as an integral part of the generator housing 26, but it may be a separate component. Shaft 18 serves to rotate the rotor of generator 22, as is well known in the art. Shaft 18 is preferably aligned with an axis of symmetry of second turbine 14 so as to be statically and dynamically balanced when rotated.

Wind generator 10 also has a pipe 24 disposed between first turbine 12 and second ring gear 32. Pipe 24 is rotatably attached to gearbox 20 by, for example, bearings, and has a hollow interior so as to allow shaft 18 to pass through the hollow interior region. Pipe 24 is preferably coaxially aligned with shaft 18 and shaft 18 may be mounted in bearings 25 disposed in the annular region between shaft 18 and pipe 24. Second turbine 14 is cantilevered from shaft 18 in the embodiment shown, though other mounting configurations could be used.

As stated above, in the configuration shown in FIG. 6, gearbox 20 is located between first turbine 12 and electrical generator 22. A first ring gear 28 is disposed in gearbox 20 and is attached to shaft 18 near the end of gearbox 20 most proximate to electrical generator 22. FIG. 6 shows a partially exploded or exaggerated view in which second turbine 14 is translated forward of its normal operating position. That is for illustration only. In addition, gearbox 20 has a gearbox housing 30 that is only partially shown so that the interior of gearbox 20 can be seen. First ring gear 28 is proximate to and engages other gears within gearbox 20, as described below. Thus, shaft 18, first ring gear 28, and second turbine 14 all rotate together. A front seal 31 may be used to seal the annular opening between shaft 18 and gearbox housing 30. Similarly, a rear seal 33 can be used to seal the annular space between shaft 18 and generator housing 26, where shaft 18 enters generator housing 26. A second ring gear 32 is disposed in gearbox 20 and is fixed to the rearward end of pipe 24 using, for example, a flange. Pipe 24 is attached on its forward end to first turbine 12. In this embodiment, pipe 24, first turbine 12, and second ring gear 32 all rotate together, which is operationally quite different from the embodiments described above for FIGS. 1-5. Pipe 24 was fixed relative to electrical generator 22 in those embodiments, but rotates relative to electrical generator 22 both in this embodiment and those shown in FIGS. 7 and 8.

Two or more satellite gears 34 are disposed between and rotatably engage first ring gear 28 and second ring gear 32. Preferably two pairs of diametrically opposed satellite gears 34 are used (i.e., four gears spaced ninety degrees apart), but more or fewer satellite gears 34 may be used. First ring gear 28, second ring gear 32, and satellite gears 34 are all preferably beveled in a complementary fashion, as is known in the art, so as to allow satellite gears 34 to simultaneously engage and rotate relative to first ring gear 28 and second ring gear 32. Each satellite gear 34 is rotatably mounted on one end of an associated rod 36. The other end of that associated rod 36 is attached to gearbox housing 30. Thus, while each satellite gear 34 is free to rotate about its associated rod 36, each satellite gear 34 remains in a fixed location relative to gearbox housing 30. As before, in the configuration described, first ring gear 28 and second ring gear 32 rotate in opposite directions.

Figure 7:
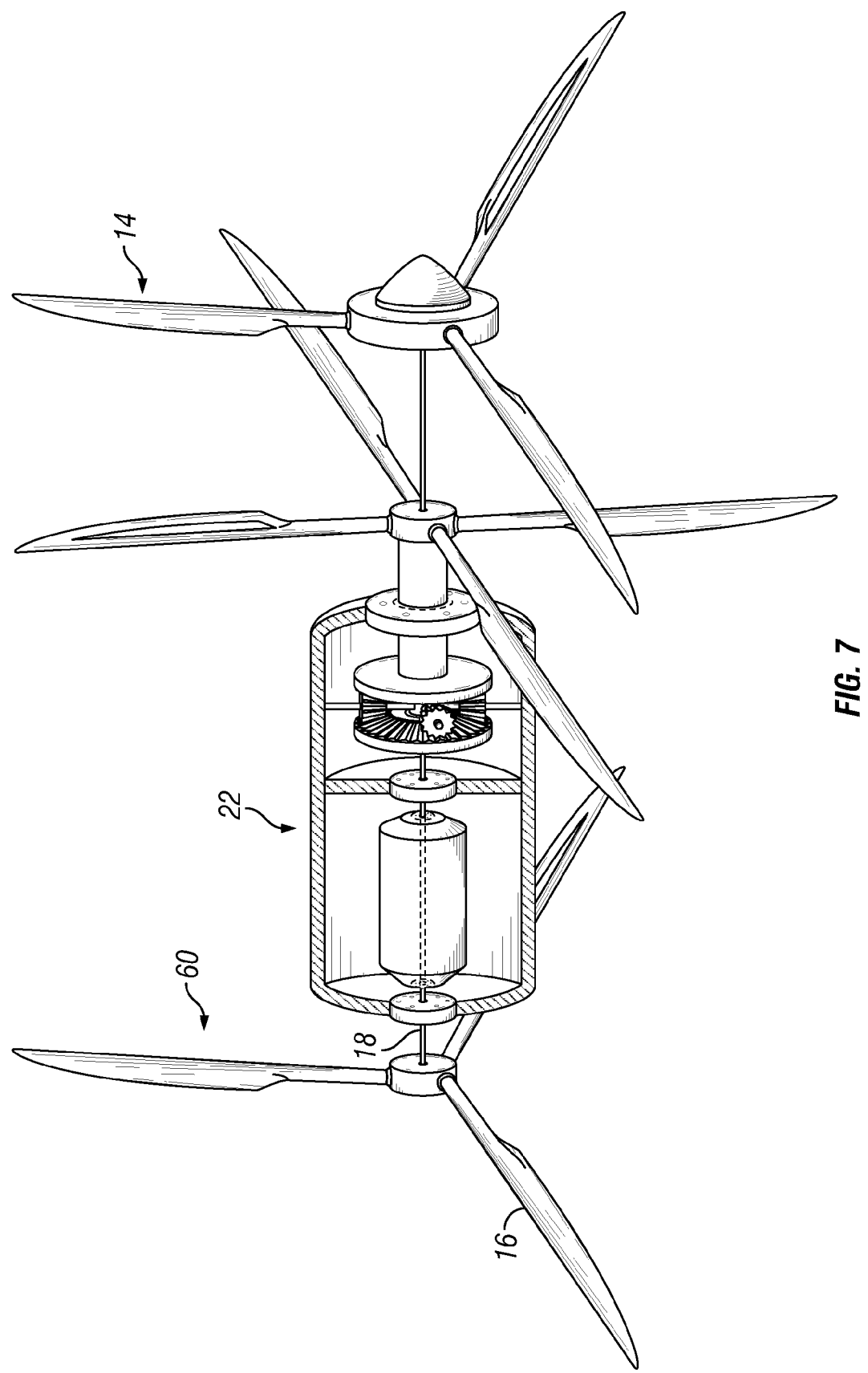
FIG. 7 is a schematic drawing of a wind generator that includes an alternative embodiment of the drive system of FIG. 6.

FIG. 7 shows an embodiment similar to that of FIG. 6, but with a third turbine 60 attached (directly of indirectly) to rotor shaft 18 on the opposite side of electrical generator 22. Third turbine 60 preferably has three blades 16 and rotates in the same direction as second turbine 14.

Figure 8:
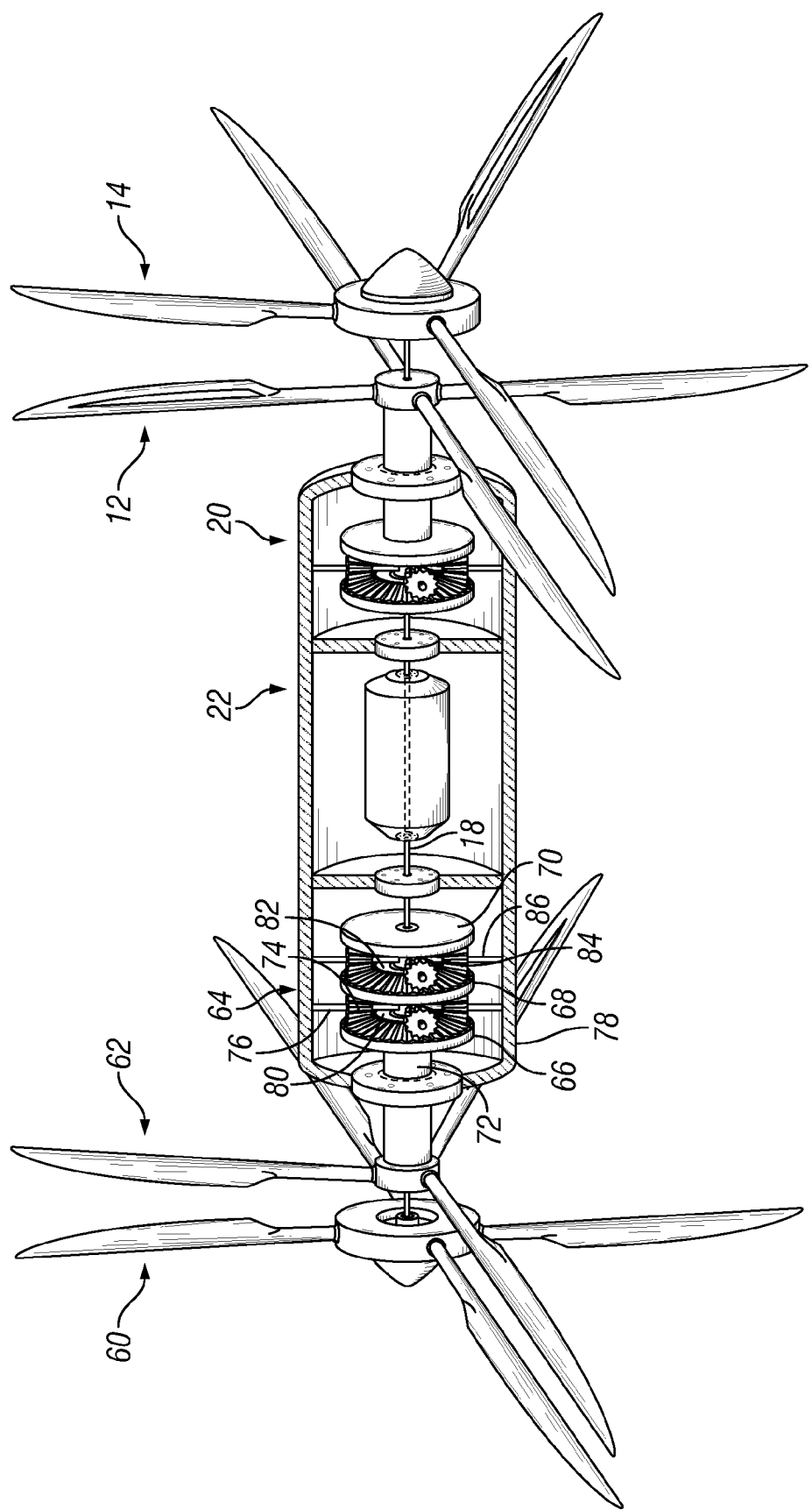
FIG. 8 is a schematic drawing of a wind generator that includes an alternative embodiment of the drive system of FIG. 6.

The embodiment of FIG. 8 extends the embodiments of FIGS. 6 and 7 to include multiple turbines on each side of electrical generator 22. The side forward or to the right of electrical generator 22 has the same components and configuration as that shown in FIGS. 6 and 7. The rearward side, or side to the left of electrical generator 22, however, now has a fourth turbine 62 in addition to the third turbine 60 of FIG. 7. Because first turbine 12 in this embodiment has four blades 16 and is designed to rotate counterclockwise when viewed from the forward end, fourth turbine 62 preferably has three blades 16 and is designed to rotate clockwise when viewed from the right. Accordingly, third turbine 60 preferably has four blades 16 and is designed to rotate counterclockwise to make the most of the wind passing off of and through fourth turbine 62.

The gearbox 64 shown in FIG. 8 is similar to gearbox 20, but is modified to insure the torque from each of the rearward turbines combines cooperatively with the torque of the forward turbines. Specifically, this embodiment has a third ring gear 66, a fourth ring gear 68, and a fifth ring gear 70. Third ring gear 66 attaches on its rearward side to one end of a pipe 72, and pipe 72 attaches at its opposite end to the forward side of fourth turbine 62. Pipe 72, third ring gear 66, and fourth turbine 62 all rotate together since pipe 72 is rotatably attached to gearbox 64.

A first rearward set of satellite gears 74 is disposed between and rotatably engage third ring gear 66 and fourth ring gear 68. Preferably two pairs of diametrically opposed satellite gears 74 are used (i.e., four gears spaced ninety degrees apart), but more or fewer satellite gears 74 may be used. Third ring gear 66, fourth ring gear 68, fifth ring gear 70, and satellite gears 74 are all preferably beveled in a complementary fashion, as is known in the art, so as to allow satellite gears 74 to simultaneously engage and rotate relative to its associated ring gears. Each satellite gear 74 is rotatably mounted on one end of an associated rod 76. The other end of that associated rod 76 is attached to gearbox housing 78. Thus, while each satellite gear 74 is free to rotate about its associated rod 76, each satellite gear 74 remains in a fixed location relative to gearbox housing 78. As before, in the configuration described, third ring gear 66 and fourth ring gear 68 rotate in opposite directions.

Fourth ring gear 68 has gear faces on both its forward and rearward sides and attaches to a rear shaft 80. Rear shaft 80 attaches at its rearward end to the forward side of third turbine 60, extends forward from there through fourth turbine 62, through the interior region of pipe 72, through third and fourth ring gears 66, 68, and finally terminates at its forward end into the rearward side of a bearing 82. Third turbine 60, rear shaft 78 and fourth ring gear 66 all rotate together. The first rearward set of satellite gears 74 engage the rearward face of fourth ring gear 66.

In the embodiment of FIG. 8, shaft 18 (or, equivalently, an extension thereof) extends rearward out of electrical generator 22 into gearbox 64, through fifth ring gear 70, and terminates at its rearward end into the forward side of bearing 82. Fifth ring gear 70 attaches to and rotates with shaft 18. A second rearward set of satellite gears 84 is disposed between and rotatably engages fifth ring gear 70 and the forward face of fourth ring gear 68. Preferably two pairs of diametrically opposed satellite gears 84 are used (i.e., four gears spaced ninety degrees apart), but more or fewer satellite gears 84 may be used. Each satellite gear 84 is rotatably mounted on or near one end of an associated rod 86. The other end of that associated rod 76 is attached to gearbox housing 78. Thus, while each satellite gear 84 is free to rotate about its associated rod 86, each satellite gear 84 remains in a fixed location relative to gearbox housing 78. Preferably the end of associated rod 86 extending through satellite gear 84 terminates on the housing of bearing 82 to provide structural support to bearing 82. The second rearward set of satellite gears 84 transfers the combined torque from third and fourth turbines 60, 62 cooperatively into shaft 18. Other seals and bearings may be used as described above and their description will not be repeated here.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A drive system used with a flowing fluid, comprising:
   a first gear joined to a shaft;
   a first turbine joined to a rotatable pipe, the first turbine being disposed on one side of a housing;
   a second gear joined to the rotatable pipe and disposed laterally to the first gear, and
   one or more satellite gears, each rotatably mounted on a non-driveshaft rod, in fixed locations relative to the housing and disposed between the first gear and the second gear and directly, rotatably engaged with the first gear and the second gear, and wherein the first gear and the second gear rotate in opposite directions to cooperatively rotate the shaft.

2. The drive system of claim 1, further comprising a second turbine joined to the shaft, the second turbine being disposed on the same side of the housing as the first turbine.

3. The drive system of claim 1, wherein the shaft passes through an interior region of the rotatable pipe.

4. The drive system of claim 1, wherein the shaft is mounted in one or more bearings.

5. The drive system of claim 4, wherein at least one of the one or more bearings is a pressure bearing.

6. The drive system of claim 1, wherein each rod extends from the housing to the satellite gear.

7. The drive system of claim 1, further comprising:
   a connecting apparatus joined to the shaft and through which the shaft passes;
   a second turbine joined to the shaft on one side of the connecting apparatus; and
   a third turbine joined to the shaft on the opposite side of the connecting apparatus.

8. A method to extract energy from a flowing fluid, comprising:
   providing a drive system comprising a first gear joined to a shaft, a first turbine joined to a rotatable pipe, the first turbine being disposed on one side of a housing, a second gear joined to the rotatable pipe and disposed laterally to the first gear, and one or more satellite gears, each rotatably mounted on a non-driveshaft rod, in fixed locations relative to the housing and disposed between the first gear and the second gear and directly, rotatably engaged with the first gear and the second gear, and wherein the first gear and the second gear rotate in opposite directions to cooperatively rotate the shaft; and
   placing the drive system in the flowing fluid.

9. The method of claim 8, further comprising adding to the drive system a second turbine joined to the shaft, the second turbine being disposed on the same side of the housing as the first turbine.

10. The method of claim 8, further comprising coupling the shaft to a device.

11. The method of claim 8, wherein the fluid is air or water.

12. A wind generator, comprising:
a first gear joined to a shaft;
a first turbine joined to a rotatable pipe, the first turbine being disposed on one side of a housing;
a second gear joined to the rotatable pipe and disposed laterally to the first gear;
one or more satellite gears, each rotatably mounted on a non-driveshaft rod, in fixed locations relative to the housing and disposed between the first gear and the second gear and directly, rotatably engaged with the first gear and the second gear, and wherein the first gear and the second gear rotate in opposite directions to cooperatively rotate the shaft; and
a generator coupled to the shaft.

13. The wind generator of claim 12, further comprising a second turbine joined to the shaft, the second turbine being disposed on the same side of the housing as the first turbine.

14. The wind generator of claim 12, wherein each rod extends from the housing to the satellite gear.

15. A drive system used with a flowing fluid to drive a connecting apparatus, comprising:
a first gear joined directly or indirectly to a shaft;
a first turbine joined directly or indirectly to a first rotatable pipe, the first rotatable pipe being located on one side of the connecting apparatus;
a second gear joined directly or indirectly to the first rotatable pipe,
a first set of one or more satellite gears in fixed locations relative to a housing and rotatably engaged, directly or indirectly, with the first gear and the second gear;
a second turbine joined directly or indirectly to a second rotatable pipe, the second rotatable pipe being located on the opposite side of the connecting apparatus from the first rotatable pipe;
a third gear joined directly or indirectly to the second rotatable pipe;
a fourth gear joined directly or indirectly to the shaft, and
a second set of one or more satellite gears in fixed locations relative to the housing and rotatably engaged, directly or indirectly, with the third gear and the fourth gear.

16. The drive system of claim 15, further comprising a third turbine joined to the shaft on the same side of the connecting apparatus as the first turbine.

17. The drive system of claim 16, further comprising:
a fourth turbine joined to a rear shaft on the same side of the connecting apparatus as the second turbine, wherein the rear shaft extends between the fourth turbine and a rearward side of a bearing having a bearing housing;
a fifth gear joined directly or indirectly to the shaft and joined to a forward side of the bearing; and
a third set of one or more satellite gears in fixed locations relative to the housing and rotatably engaged, directly or indirectly, with the fourth gear and the fifth gear.

18. The drive system of claim 17, further comprising for each satellite gear, a rod that extends from the respective housing to the satellite gear.

19. The drive system of claim 18, wherein the rod or rods associated with the third set of satellite gears further extend through the satellite gear and terminate on the bearing housing.

20. The drive system of claim 15, wherein the connecting apparatus is an electrical generator.

* * * * *